United States Patent
Elshafie et al.

(10) Patent No.: US 12,432,596 B2
(45) Date of Patent: Sep. 30, 2025

(54) CHANNEL STATE INFORMATION (CSI) REPORTING FOR ONE OR BOTH OF A PRIVATE MESSAGE (P-MESSAGE) OR A COMMON MESSAGE (C-MESSAGE)

(71) Applicant: QUALCOMM Incorporated, San Diego, CA (US)

(72) Inventors: Ahmed Elshafie, San Diego, CA (US); Ahmed Abdelaziz Ibrahim Abdelaziz Zewail, San Diego, CA (US); Ahmed Attia Abotabl, San Diego, CA (US); Marwen Zorgui, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 456 days.

(21) Appl. No.: 17/938,555

(22) Filed: Oct. 6, 2022

(65) Prior Publication Data
US 2024/0121646 A1    Apr. 11, 2024

(51) Int. Cl.
*H04W 24/10*    (2009.01)
*H04L 1/1812*    (2023.01)

(52) U.S. Cl.
CPC ........... *H04W 24/10* (2013.01); *H04L 1/1812* (2013.01)

(58) Field of Classification Search
CPC ............... H04W 24/10; H04L 1/1812; H04L 2001/0093
See application file for complete search history.

(56) References Cited

U.S. PATENT DOCUMENTS

| | | | |
|---|---|---|---|
| 2011/0218000 A1* | 9/2011 | Noh | H04W 52/267 455/501 |
| 2012/0214497 A1* | 8/2012 | Shin | H04W 16/32 455/449 |
| 2013/0237210 A1* | 9/2013 | Kang | H04B 7/0617 455/422.1 |
| 2021/0049224 A1* | 2/2021 | Zheng | G06F 16/909 |
| 2022/0400475 A1* | 12/2022 | Suh | H04W 72/23 |
| 2024/0048288 A1* | 2/2024 | Fakoorian | H04W 72/56 |
| 2024/0195528 A1* | 6/2024 | Elshafie | H04L 1/1887 |
| 2025/0024457 A1* | 1/2025 | Elshafie | H04W 72/23 |

FOREIGN PATENT DOCUMENTS

WO    WO-2016089269 A1    6/2016
WO    WO-2023122097 A1 *  6/2023

OTHER PUBLICATIONS

Dizdar O., et al., "Rate-Splitting Multiple Access: A New Frontier for the PHY Layer of 6G", Dec. 2020.
(Continued)

*Primary Examiner* — Deepa Belur
(74) *Attorney, Agent, or Firm* — Kevin M. Donnelly; Norton Rose Fulbright US LLP

(57) ABSTRACT

Some aspects of the disclosure are related to channel state information (CSI) reporting for one or both of a private message (p-message) or a common message (c-message). In some aspects, a user equipment (UE) may receive a signal that includes a p-message associated with the UE and a c-message associated with the UE and at least one other UE. The UE may transmit a measurement report that indicates one or both of first CSI associated with the p-message or second CSI associated with the c-message.

28 Claims, 6 Drawing Sheets

(56) References Cited

OTHER PUBLICATIONS

Joudeh H., et al., "Sum-Rate Maximization for Linearly Precoded Downlink Multiuser MISO Systems with Partial CSIT: A Rate-Splitting Approach", Nov. 2016.
Mao Y., et al., "Rate-Splitting Multiple Access for Downlink Communication Systems: Bridging, Generalizing and Outperforming SDMA and NOMA", arxiv.org, Cornell University Library, 201 Olin library Cornell University Ithaca, NY 14853, Apr. 17, 2018, Oct. 30, 2017.
International Search Report and Written Opinion—PCT/US2023/071137—ISA/EPO—Nov. 22, 2023.
Kolawole O., et al., "A Rate-splitting Strategy for Multi-User Millimeter-Wave Systems with Imperfect CSI", 2018 IEEE 19th International Workshop on Signal Processing Advances in Wireless Communications (SPAWC), IEEE, Jun. 25, 2018, 5 pages.
Mosquera C., et al., "Space-Time Rate Splitting for the MISO BC With Magnitude CSIT", IEEE Transactions on Communications, IEEE Service Center, Piscataway, NJ. USA, vol. 69, No. 7, Apr. 20, 2021, pp. 4417-4432.
Naser S., et al., "Rate-Splitting Multiple Access: Unifying NOMA and SDMA in MISO VLC Channels", IEEE Open Journal of Vehicular Technology, IEEE, vol. 1, Oct. 16, 2020, pp. 393-413.

\* cited by examiner

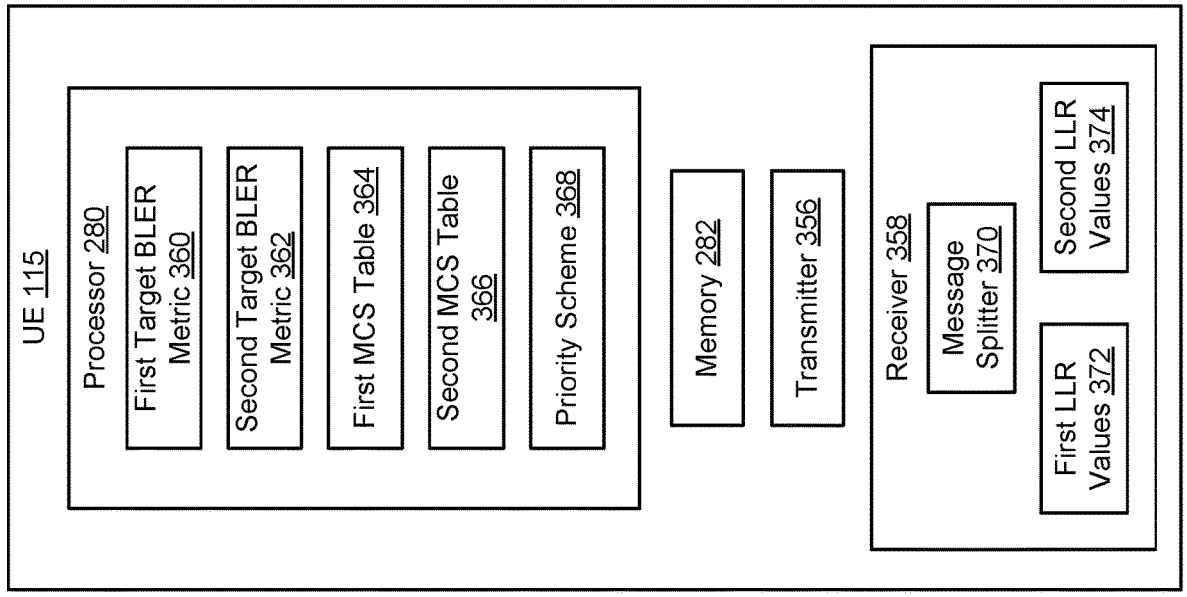
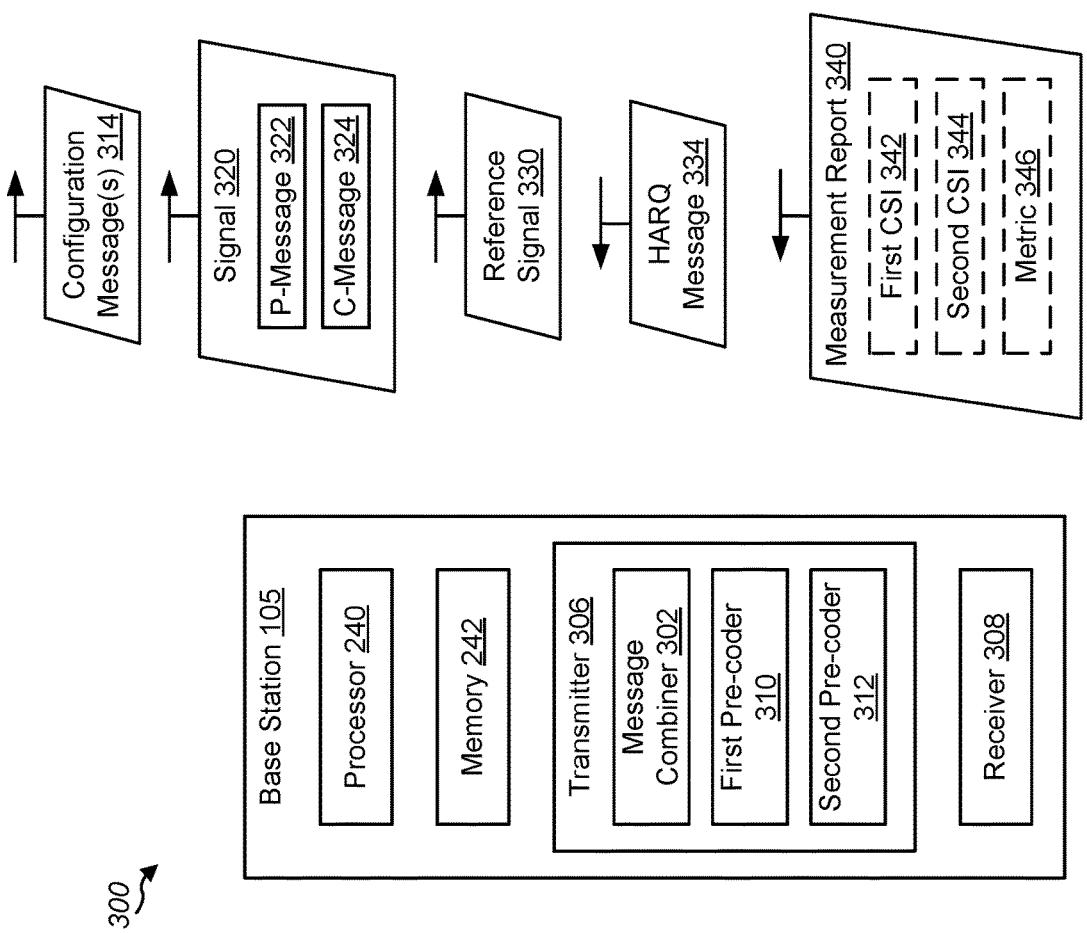
FIGURE 3

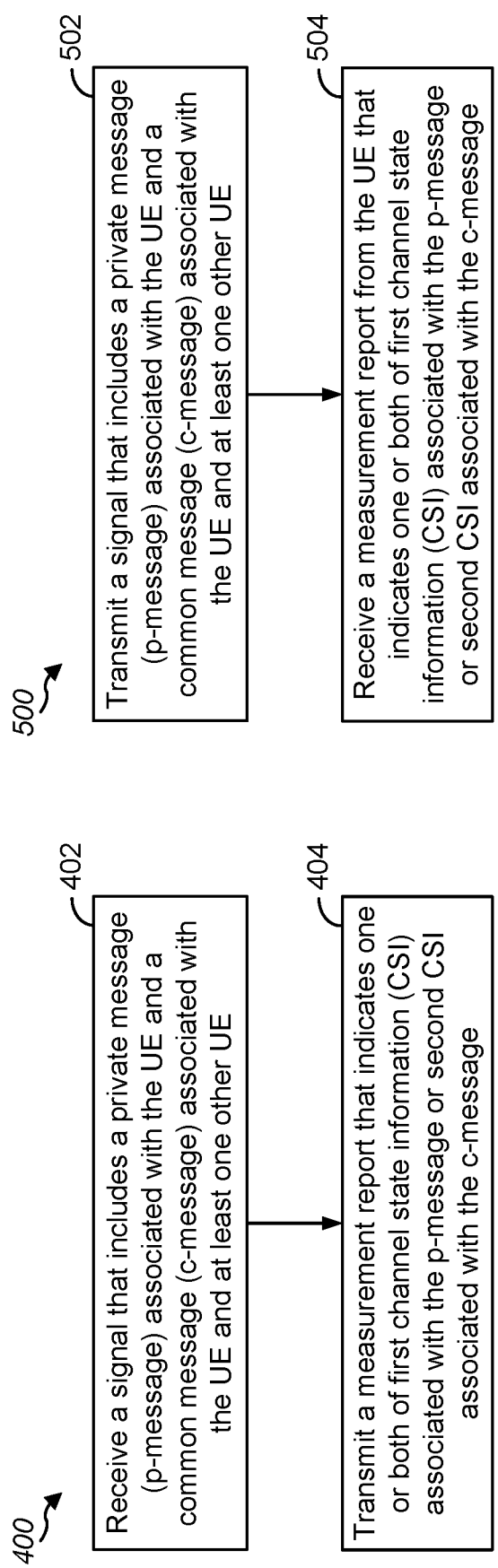

CHANNEL STATE INFORMATION (CSI) REPORTING FOR ONE OR BOTH OF A PRIVATE MESSAGE (P-MESSAGE) OR A COMMON MESSAGE (C-MESSAGE)

TECHNICAL FIELD

Aspects of the present disclosure relate generally to wireless communication systems, and more particularly, to reporting of channel state information (CSI) within a wireless communication system.

DESCRIPTION OF THE RELATED TECHNOLOGY

Wireless communications systems are widely deployed to provide various types of communication content such as voice, video, packet data, messaging, broadcast, and so on. A wireless multiple-access communications system may include a number of base stations or network access nodes, each simultaneously supporting communication for multiple communication devices, which may be otherwise known as user equipment (UE). These systems may be capable of supporting communication with multiple UEs by sharing the available system resources (such as time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

As the number of wireless communication devices increases, signaling within a wireless communication system may be associated with noise and interference, which may reduce performance of a wireless communication system. To reduce an amount of transmitted signaling and to improve performance, a wireless communication system may use a rate splitting (RS) or rate-splitting multiple access (RSMA) technique in which a signal may include a private message (p-message) and a common message (c-message). The p-message may include data associated with one UE, and the c-message may include data associated with multiple UEs. By including the p-message and the c-message in the signal, an amount of redundant signaling may be reduced. Further, in some implementations, a UE receiving the signal may use successive interference cancelation (SIC) to decode the p-message based on the c-message, which may improve decoding performance of the UE.

In some implementations, use of an RS or RSMA technique may increase complexity, cost, or overhead associated with a wireless communication system. For example, in a beamforming implementation, the p-message and the c-message may be associated with different beams, which may enable one UE to receive the p-message and multiple UEs to receive the c-message. In such examples, a base station transmitting the signal may need to separately manage beams for the c-message and for each p-message, which may increase complexity, cost, or overhead associated with the wireless communication system.

SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

One innovative aspect of the subject matter described in this disclosure can be implemented in a UE. The UE includes at least one processor and a memory coupled with the at least one processor and storing processor-readable instructions that, when executed by the at least one processor, is configured to receive a signal that includes a private message (p-message) associated with the UE and a common message (c-message) associated with the UE and at least one other UE. The processor-readable code is further executable by the at least one processor to transmit a measurement report that indicates one or both of first channel state information (CSI) associated with the p-message or second CSI associated with the c-message.

Another innovative aspect of the subject matter described in this disclosure can be implemented in a method for wireless communication performed by a UE. The method includes receiving a signal that includes a p-message associated with the UE and a c-message associated with the UE and at least one other UE. The method further includes transmitting a measurement report that indicates one or both of first CSI associated with the p-message or second CSI associated with the c-message.

Another innovative aspect of the subject matter described in this disclosure can be implemented in a base station. The base station includes at least one processor and a memory coupled with the at least one processor and storing processor-readable code that, when executed by the at least one processor, is configured to transmit a signal that includes a p-message associated with a UE and a c-message associated with the UE and at least one other UE. The processor-readable code is further executable by the at least one processor to receive a measurement report from the UE that indicates one or both of first CSI associated with the p-message or second CSI associated with the c-message.

Another innovative aspect of the subject matter described in this disclosure can be implemented in a method for wireless communication performed by a base station. The method includes transmitting a signal that includes a p-message associated with a UE and a c-message associated with the UE and at least one other UE. The method further includes receiving a measurement report from the UE that indicates one or both of first CSI associated with the p-message or second CSI associated with the c-message.

Other aspects, features, and implementations of the present disclosure will become apparent to a person having ordinary skill in the art, upon reviewing the following description of specific, example implementations of the present disclosure in conjunction with the accompanying figures. While features of the present disclosure may be described relative to particular implementations and figures below, all implementations of the present disclosure can include one or more of the advantageous features described herein. In other words, while one or more implementations may be described as having particular advantageous features, one or more of such features may also be used in accordance with the various implementations of the disclosure described herein. In similar fashion, while example implementations may be described below as device, system, or method implementations, such example implementations can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 3 is a block diagram illustrating an example wireless communication system that supports channel state information (CSI) reporting for one or both of a private message (p-message) or a common message (c-message) according to one or more aspects.

FIG. 4 is a flow diagram illustrating an example process that supports CSI reporting for one or both of a p-message or a c-message according to one or more aspects.

FIG. 5 is a flow diagram illustrating an example process that supports CSI reporting for one or both of a p-message or a c-message according to one or more aspects.

Like reference numbers and designations in the various drawings indicate like elements.

DETAILED DESCRIPTION

Figure 1:
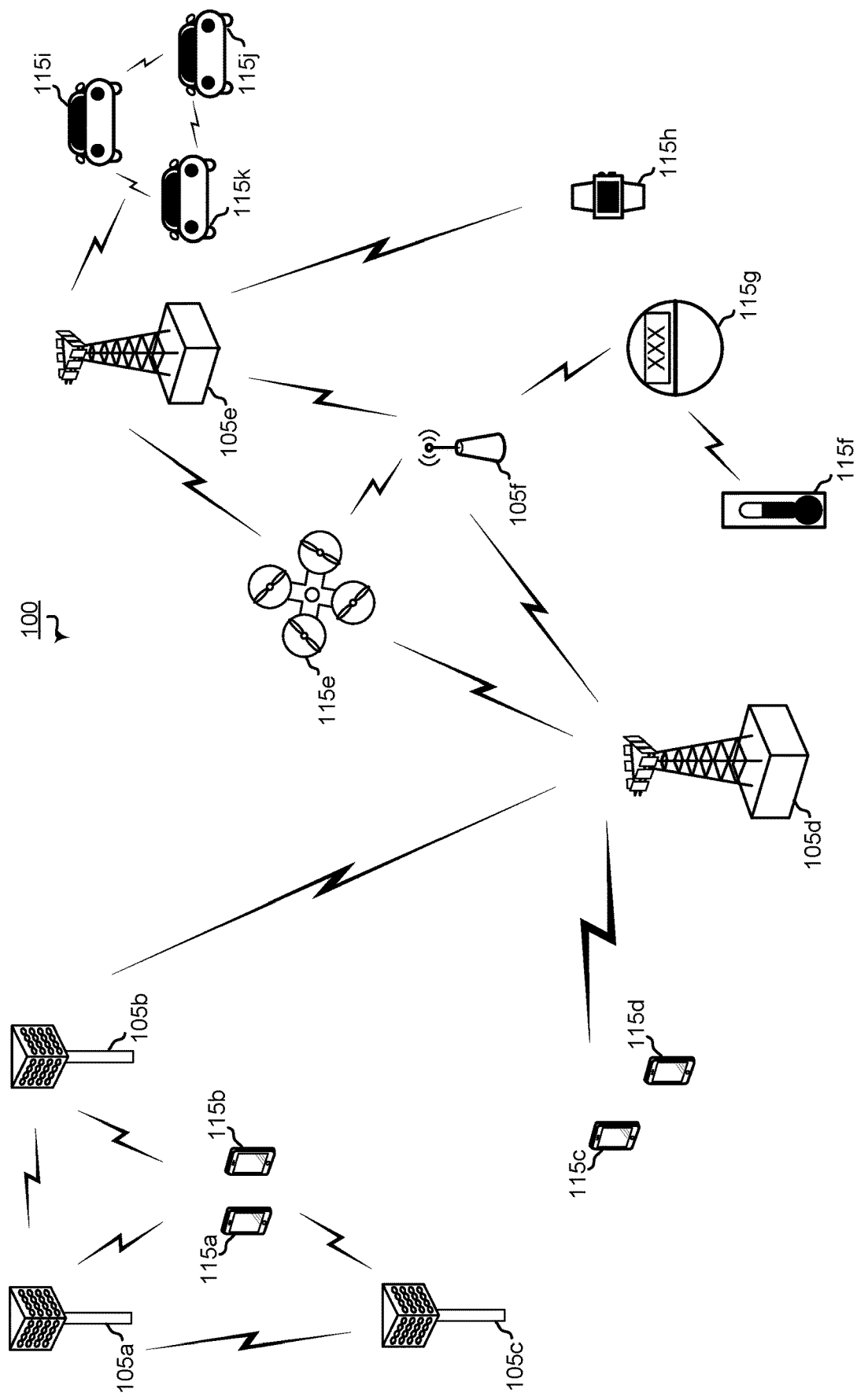
FIG. 1 is a block diagram illustrating details of an example wireless communication system according to one or more aspects.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein.

Any aspect of the disclosure disclosed herein may be embodied by one or more elements of a claim.

Some aspects of the disclosure are related to channel state information (CSI) reporting for one or both of a private message (p-message) or a common message (c-message). In some aspects, a user equipment (UE) may receive a signal that includes a p-message associated with the UE and a c-message associated with the UE and at least one other UE. The UE may determine one or both of first CSI associated with the p-message or second CSI associated with the c-message. In some examples, the UE may determine the first CSI and the second CSI in accordance with decoding of the signal. For example, the UE may determine the first CSI and the second CSI based on a reference signal associated with the signal, such as a demodulation reference signal (DMRS) or a CSI reference signal (CSI-RS), that is used to decode the signal. Alternatively or in addition, the UE may determine the first CSI and the second CSI based on values determined during decoding of the signal, such as log-likelihood ratio (LLR) values determined during decoding of the signal.

The UE may transmit, to a base station, a measurement report indicating one or more of the first CSI, the second CSI, or a metric representing a combination of the first CSI and the second CSI (such as an average of parameters associated with the first CSI and the second CSI). In some examples, the base station 105 may adjust one or more parameters based on the measurement report. For example, the base station may change one or more pre-coders to reduce a block error rate (BLER) associated with p-messages, to reduce a BLER associated with c-messages, or both.

Particular implementations of the subject matter described in this disclosure can be implemented to realize one or more of the following potential advantages. For example, by reporting one or more of the first CSI, the second CSI, or the metric, the base station may independently determine or adjust one or more parameters associated with p-messages, c-messages, or both. By independently adjusting the one or more parameters, the base station may independently reduce BLER metrics associated with the p-messages and c-messages. As a result, reception of p-messages and c-messages within the wireless communication system may be improved, which may reduce a number of negative-acknowledgement (NACK) messages and retransmissions in some cases.

In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably. In some implementations, two or more wireless communications systems, also referred to as wireless communications networks, may be configured to provide or participate in authorized shared access between the two or more wireless communications systems.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM or GSM EDGE, together with the network that joins the base stations (for example, the Ater and Abis interfaces, among other examples) and the base station controllers (for example, A interfaces, among other examples). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may include one or more GERANs, which may be coupled with UTRANs in the case of a UMTS or GSM network. Additionally, an operator network may include one or more LTE networks, or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named the "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, 5G, or NR technologies; however, the description is not intended to be limited to a specific technology or application, and one or more aspects described with reference to one technology may be understood to be applicable to another technology. Indeed, one or more aspects the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (such as ~1M nodes per km2), ultra-low complexity (such as ~10s of bits per sec), ultra-low energy (such as ~10+ years of battery life), and deep coverage with the capability to reach challenging locations; (2) including mission-critical control with strong security to safeguard sensitive personal, financial, or classified information, ultra-high reliability (such as ~0.99.9999% reliability), ultra-low latency (such as ~1 millisecond (ms)), and users with wide ranges of mobility or lack thereof; and (3) with enhanced mobile broadband including extreme high capacity (such as ~10 Tbps per km2), extreme data rates (such as multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) or frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80 or 100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

FIG. 1 is a block diagram illustrating details of an example wireless communication system. The wireless communication system may include wireless network 100. The wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements, such as device-to-device, peer-to-peer or ad hoc network arrangements, among other examples.

The wireless network 100 illustrated in FIG. 1 includes a number of base stations 105 and other network entities. A base station may be a station that communicates with the UEs and may be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station or a base station subsystem serving the coverage area, depending on the context in which the term is used. In implementations of the wireless network 100 herein, the base stations 105 may be associated with a same operator or different operators, such as the wireless network 100 may include a plurality of operator wireless networks. Additionally, in implementations of the wireless network 100 herein, the base stations 105 may provide wireless communications using one or more of the same frequencies, such as one or more frequency bands in licensed spectrum, unlicensed spectrum, or a combination thereof, as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area, such as several kilometers in radius, and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area, such as a home, and, in addition to unrestricted access, may provide restricted access by UEs having an association with the femto cell, such as UEs in a closed subscriber group (CSG), UEs for users in the home, and the like. A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple cells, such as two cells, three cells, four cells, and the like.

The wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

The UEs 115 are dispersed throughout the wireless network 100, and each UE may be stationary or mobile. It should be appreciated that, although a mobile apparatus is commonly referred to as user equipment (UE) in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may include implementations of one or more of the UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, a gesture tracking device, a medical device, a digital audio player (such as MP3 player), a camera or a game console, among other examples; and digital home or smart home devices such as a home audio, video, and multimedia device, an appliance, a sensor, a vending machine, intelligent lighting, a home security system, or a smart meter, among other examples. In one aspect, a UE may be a device that includes a Universal Integrated Circuit Card (UICC). In another aspect, a UE may be a device that does not include a UICC. In some aspects, UEs that do not include UICCs may be referred to as IoE devices. The UEs 115a-115d of the implementation illustrated in FIG. 1 are examples of mobile smart phone-type devices accessing the wireless network 100. A UE may be a machine specifically configured for connected communication, including machine type communication (MTC), enhanced MTC (eMTC), narrowband IoT (NB-IoT) and the like. The UEs 115e-115k illustrated in FIG. 1 are examples of various machines configured for communication that access 5G network 100.

A mobile apparatus, such as the UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. Backhaul communication between base stations of the wireless network 100 may occur using wired or wireless communication links.

In operation at the 5G network 100, the base stations 105a-105c serve the UEs 115a and 115b using 3D beamforming and coordinated spatial techniques, such as coordinated multipoint (CoMP) or multi-connectivity. Macro base station 105d performs backhaul communications with the base stations 105a-105c, as well as small cell, the base station 105f. Macro base station 105d also transmits multicast services which are subscribed to and received by the UEs 115c and 115d. Such multicast services may include mobile television or stream video, or may include other services for providing community information, such as weather emergencies or alerts, such as Amber alerts or gray alerts.

The wireless network 100 of implementations supports mission critical communications with ultra-reliable and redundant links for mission critical devices, such the UE 115e, which is a drone. Redundant communication links with the UE 115e include from the macro base stations 105d and 105e, as well as small cell base station 105f. Other machine type devices, such as UE 115f (thermometer), the UE 115g (smart meter), and the UE 115h (wearable device) may communicate through the wireless network 100 either directly with base stations, such as the small cell base station 105f, and the macro base station 105e, or in multi-hop configurations by communicating with another user device which relays its information to the network, such as the UE 115f communicating temperature measurement information to the smart meter, the UE 115g, which is then reported to the network through the small cell base station 105f. The 5G network 100 may provide additional network efficiency through dynamic, low-latency TDD or FDD communications, such as in a vehicle-to-vehicle (V2V) mesh network between the UEs 115i-115k communicating with the macro base station 105e.

Figure 2:
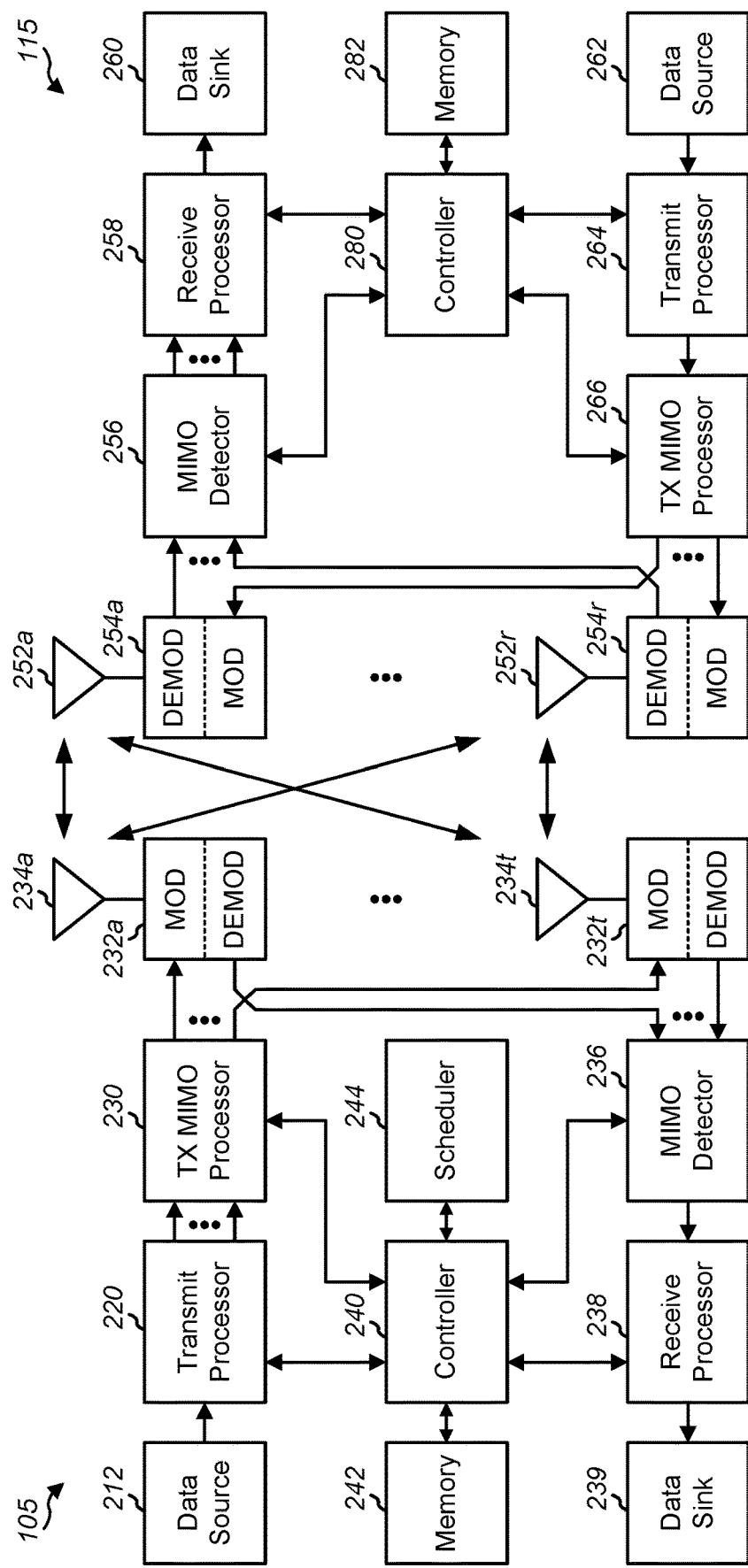
FIG. 2 is a block diagram illustrating examples of a base station and a user equipment (UE) according to one or more aspects.

FIG. 2 is a block diagram conceptually illustrating an example design of a base station 105 and a UE 115. The base station 105 and the UE 115 may be one of the base stations and one of the UEs in FIG. 1. For a restricted association scenario (as mentioned above), the base station 105 may be the small cell base station 105f in FIG. 1, and the UE 115 may be the UE 115c or 115d operating in a service area of the base station 105f, which in order to access the small cell base station 105f, would be included in a list of accessible UEs for the small cell base station 105f. Additionally, the base station 105 may be a base station of some other type. As shown in FIG. 2, the base station 105 may be equipped with antennas 234a through 234t, and the UE 115 may be equipped with antennas 252a through 252r for facilitating wireless communications.

At the base station 105, a transmit processor 220 may receive data from a data source 212 and control information from a processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), or MTC physical downlink control channel (MPDCCH), among other examples. The data may be for the PDSCH, among other examples. The transmit processor 220 may process, such as encode and symbol map, the data and control information to obtain data symbols and control symbols, respectively. Additionally, the transmit processor 220 may generate reference symbols, such as for the primary synchronization signal (PSS) and secondary synchronization signal (SSS), and cell-specific reference signal. Transmit (TX) multiple-input multiple-output (MIMO) processor 230 may perform spatial processing on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream, such as for OFDM, among other examples, to obtain an output sample stream. Each modulator 232 may additionally or alternatively process the output sample stream to obtain a downlink signal. For example, to process the output sample stream, each modulator 232 may convert to analog, amplify, filter, and upconvert the output sample stream to obtain the downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DE-MODs) 254a through 254r, respectively. Each demodulator 254 may condition a respective received signal to obtain input samples. For example, to condition the respective received signal, each demodulator 254 may filter, amplify, downconvert, and digitize the respective received signal to obtain the input samples. Each demodulator 254 may further process the input samples, such as for OFDM, among other examples, to obtain received symbols. MIMO detector 256 may obtain received symbols from demodulators 254a through 254r, perform MIMO detection on the received symbols if applicable, and provide detected symbols. Receive processor 258 may process the detected symbols, provide decoded data for the UE 115 to a data sink 260, and provide decoded control information to a processor 280. For example, to process the detected symbols, the receive processor 258 may demodulate, deinterleave, and decode the detected symbols.

On the uplink, at the UE 115, a transmit processor 264 may receive and process data (such as for the physical uplink shared channel (PUSCH)) from a data source 262 and control information (such as for the physical uplink control channel (PUCCH)) from the processor 280. Additionally, the transmit processor 264 may generate reference symbols for a reference signal. The symbols from the transmit processor 264 may be precoded by TX MIMO processor 266 if applicable, further processed by the modulators 254a through 254r (such as for SC-FDM, among other examples), and transmitted to the base station 105. At base station 105, the uplink signals from the UE 115 may be received by antennas 234, processed by demodulators 232, detected by MIMO detector 236 if applicable, and further processed by receive processor 238 to obtain decoded data and control information sent by the UE 115. The receive processor 238 may provide the decoded data to data sink 239 and the decoded control information to the processor 240.

The processors 240 and 280 may direct the operation at the base station 105 and the UE 115, respectively. The processor 240 or other processors and modules at the base station 105 or the processor 280 or other processors and modules at the UE 115 may perform or direct the execution of various processes for the techniques described herein, such as to perform or direct the execution illustrated in FIGS. 4 and 5, or other processes for the techniques described herein. The memories 242 and 282 may store data and program codes for the base station 105 and The UE 115, respectively. Scheduler 244 may schedule UEs for data transmission on the downlink or uplink.

In some cases, the UE 115 and the base station 105 may operate in a shared radio frequency spectrum band, which may include licensed or unlicensed, such as contention-based, frequency spectrum. In an unlicensed frequency portion of the shared radio frequency spectrum band, the UEs 115 or the base stations 105 may traditionally perform a medium-sensing procedure to contend for access to the frequency spectrum. For example, the UE 115 or base station 105 may perform a listen-before-talk or listen-before-transmitting (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. In some implementations, a CCA may include detection of specific sequences that indicate use of the channel. For example, another device may transmit a specific preamble prior to transmitting a data sequence. In some cases, an LBT procedure may include a wireless node adjusting its own back off window based on the amount of energy detected on a channel or the acknowledge or negative-acknowledge (ACK or NACK) feedback for its own transmitted packets as a proxy for collisions.

FIG. 3 is a block diagram illustrating an example of a wireless communication system 300 that supports CSI reporting for one or both of a p-message or a c-message according to some aspects of the disclosure. The wireless communication system 300 may include one or more base stations, such as the base station 105. The wireless communication system 300 may include multiple UEs, such as the UE 115.

The base station 105 may include one or more processors (such as the processor 240), one or more memories (such as the memory 242), a transmitter 306, and a receiver 308. The processor 240 may be coupled to the memory 242, to the transmitter 306, and to the receiver 308. In some examples, the transmitter 306 and the receiver 308 may include one or more components described with reference to FIG. 2, such as one or more of the modulator/demodulators 232*a-t*, the MIMO detector 236, the receive processor 238, the transmit processor 220, or the TX MIMO processor 230. In some implementations, the transmitter 306 and the receiver 308 may be integrated in one or more transceivers of the base station 105.

The transmitter 306 may be configured to transmit reference signals, synchronization signals, control information, and data to one or more other devices, and the receiver 308 may be configured to receive reference signals, control information, and data from one or more other devices. For example, the transmitter 306 may be configured to transmit signaling, control information, and data to the UE 115, and the receiver 308 may be configured to receive signaling, control information, and data from the UE 115.

In some implementations, the base station 105 may include an antenna array. The antenna array may include multiple antenna elements configured to perform wireless communications with other devices, such as with the UE 115. In some implementations, the antenna array may be configured to perform wireless communications using different beams, also referred to as antenna beams. The beams may include TX beams and RX beams. To illustrate, the antenna array may include multiple independent sets (or subsets) of antenna elements (or multiple individual antenna arrays), and each set of antenna elements of the antenna array may be configured to communicate using a different respective beam that may have a different respective direction than the other beams. For example, a first set of antenna elements of the antenna array may be configured to communicate via a first beam having a first direction, and a second set of antenna elements of the antenna array may be configured to communicate via a second beam having a second direction. In other implementations, the antenna array may be configured to communicate via more than two beams. Alternatively, one or more sets of antenna elements of the antenna array may be configured to concurrently generate multiple beams, for example using multiple RF chains of the base station 105. Each individual set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array may include or correspond to multiple antenna panels, and each antenna panel may be configured to communicate using a different respective beam.

The UE 115 may include one or more processors (such as the processor 280), a memory (such as the memory 282), a transmitter 356, and a receiver 358. The processor 280 may be coupled to the memory 282, to the transmitter 356, and to the receiver 358. In some examples, the transmitter 356 and the receiver 358 may include one or more components described with reference to FIG. 2, such as one or more of the modulator/demodulators 254*a-r*, the MIMO detector 256, the receive processor 258, the transmit processor 264, or the TX MIMO processor 266. In some implementations, the transmitter 356 and the receiver 358 may be integrated in one or more transceivers of the UE 115.

The transmitter 356 may transmit reference signals, synchronization signals, control information, and data to one or more other devices, and the receiver 358 may receive reference signals, control information, and data from one or more other devices. For example, in some implementations, the transmitter 356 may transmit signaling, control information, and data to the base station 105, and the receiver 358 may receive signaling, control information, and data from the base station 105.

In some implementations, one or more of the transmitter 306, the receiver 308, the transmitter 356, or the receiver 358 may include an antenna array. The antenna array may include multiple antenna elements that perform wireless communications with other devices. In some implementations, the antenna array may perform wireless communications using different beams, also referred to as antenna beams. The beams may include transmit beams and receive beams. To illustrate, the antenna array may include multiple independent sets (or subsets) of antenna elements (or multiple individual antenna arrays), and each set of antenna elements of the antenna array may be configured to communicate using a different respective beam that may have a different respective direction than the other beams. For example, a first set of antenna elements of the antenna array may be configured to communicate via a first beam having a first direction, and a second set of antenna elements of the antenna array may be configured to communicate via a second beam having a second direction. In other implementations, the antenna array may be configured to communicate via more than two beams. In some implementations, one or more sets of antenna elements of the antenna array may be configured to concurrently generate multiple beams, for example using multiple RF chains. A set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array may include or correspond to multiple antenna panels, and each antenna panel may be configured to communicate using a different respective beam.

In some implementations, the UE 115 may include an antenna array. The antenna array may include multiple antenna elements configured to perform wireless communications with other devices, such as with the base station 105. In some implementations, the antenna array may be configured to perform wireless communications using different beams, also referred to as antenna beams. The beams may include TX beams and RX beams. To illustrate, the antenna array may include multiple independent sets (or subsets) of antenna elements (or multiple individual antenna arrays), and each set of antenna elements of the antenna array may be configured to communicate using a different respective beam that may have a different respective direction than the other beams. For example, a first set of antenna elements of the antenna array may be configured to communicate via a first beam having a first direction, and a second set of antenna elements of the antenna array may be configured to communicate via a second beam having a second direction. In other implementations, the antenna array may be configured to communicate via more than two beams. Alternatively, one or more sets of antenna elements of the antenna array may be configured to concurrently generate multiple beams, for example using multiple RF chains of the UE 115. Each individual set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array may include or correspond to multiple antenna panels, and each antenna panel may be configured to communicate using a different respective beam.

In some implementations, the base station 105 may include a message combiner 302. In some implementations, the UE 115 may include a message splitter 370. The message combiner 302 and the message splitter 370 may be configured to process messages in accordance with a rate splitting (RS) or rate-splitting multiple access (RSMA) technique.

The wireless communication system 300 may use wireless communication channels, which may be specified by one or more wireless communication protocols, such as a 5G NR wireless communication protocol. To illustrate, the base station 105 may communicate with the UE 115 using one or more downlink wireless communication channels (such as via one or more of a PDSCH or a PDCCH). The UE 115 may communicate with the base station 105 using one or more uplink wireless communication channels (such as via one or more of a PUSCH or a PUCCH).

During operation the base station 105 may transmit a signal 320 that includes a private message (p-message) 322 and a common message (c-message) 324. The p-message 322 may be associated with the UE 115, and the c-message 324 may be associated with the UE 115 and at least one other UE. For example, the p-message 322 may include data that is "unique" to the UE 115, and the c-message 324 may include data that is broadcast to multiple UEs including the UE 115. In some examples, the base station 105 may use the message combiner 302 to combine the p-message 322 and the c-message 324 into the signal 320, such as in accordance with an RS or RSMA technique.

To illustrate, the base station 105 may use the message combiner 302 to combine common portions of individual messages to multiple UEs (including the UE 115 and at least one other UE) and may process the combined portions (which may include encoding and modulation) to generate the c-message 324. The base station 105 may separately process the private portions of the individual messages (which may include encoding and modulation) to determine p-messages (including the p-message 322). The base station 105 may pre-code the p-messages and the c-message 324 to generate multiple streams (including the signal 320, which may correspond to one of the streams) and may transmit the one or more streams via transmit antennas of the base station 105. In some examples, the streams may be transmitted via one base station or transmission and reception point (TRP) or via multiple base stations or TRPs, such as in connection with a coordinated multi-point transmission (CoMP) scheme.

The UE 115 may receive the signal 320, such as via a PDSCH. In some examples, the UE 115 may use the message splitter 370 to "extract" the p-message 322 and the c-message 324 from the signal 320, such as using an RS or RSMA technique. In some implementations, the UE 115 may use successive interference cancelation (SIC) to decode the p-message 322 based on the c-message 324. To illustrate, the UE 115 may perform channel estimation based on the c-message 324 to determine a channel estimate (such as a channel estimate of a PDSCH used to receive the signal 320). The UE 115 may re-encode the c-message 324 and may adjust the re-encoded c-message 324 based on the channel estimate to generate a reconstructed signal portion. The UE 115 may subtract the reconstructed signal portion from the signal 320 to generate an estimate of the p-message 322 and may decode the p-message 322 based at least in part on the estimate.

The UE 115 may determine first CSI 342 associated with the p-message 322 and may determine second CSI 344 associated with the c-message 324. For example, the UE 115 may determine the first CSI 342 and the second CSI 344 based on decoding of the signal 320 (or based on parameters determined by the UE 115 during decoding of the signal 320). To further illustrate, the first CSI 342 may include one or more of a first signal-to-interference-plus-noise ratio (SINR) associated with the p-message 322, a first channel quality indicator (CQI) associated with the p-message 322, a first rank indicator (RI) associated with the p-message 322, a first modulation and coding scheme (MCS) associated with the p-message 322, or another parameter. Alternatively or in addition, the second CSI 344 may include one or more of a second SINR associated with the c-message 324, a second CQI associated with the c-message 324, a second RI associated with the c-message 324, a second MCS associated with the c-message 324, or another parameter.

In some examples, the base station 105 may transmit a reference signal 330 in connection with the signal 320. The UE 115 may receive the reference signal 330 and may use the reference signal 330 to decode the signal 320. The UE 115 may determine one or more of the first CSI 342 or the second CSI 344 in accordance with the reference signal 330. In some examples, the reference signal 330 may correspond a demodulation reference signal (DMRS). In some other examples, the reference signal 330 may correspond to another reference signal, such as a CSI reference signal (CSI-RS).

In another example, the base station 105 may transmit different respective reference signals associated with the p-message 322 and the c-message 324. In such examples, the UE 115 may receive a first reference signal associated with the p-message 322 and may receive a second reference signal associated with the c-message 324. The UE 115 may determine the first CSI 342 in accordance with the first reference signal and may determine the second CSI 344 in accordance with the second reference signal.

Alternatively or in addition, the UE 115 may determine one or more of the first CSI 342 or the second CSI 344 in accordance with one or more other techniques. For example, the UE 115 may determine first log-likelihood ratio (LLR) values 372 associated with a first data portion of the p-message 322 and may determine second LLR values 374 associated with a second data portion of the c-message 324. To illustrate, in some examples, the receiver 358 may determine the first LLR values 372 in accordance with decoding of the p-message 322 and may determine the second LLR values 374 in accordance with decoding of the c-message 324. As an illustrative example, the UE 115 may use a low-density parity check (LDPC) decoder to decode the p-message 322 and the c-message 324 and to determine the first LLR values 372 and the second LLR values 374.

The UE 115 may transmit a measurement report 340 (such as a CSI measurement report) to the base station 105 based on the signal 320. In some examples, the measurement report 340 may be associated with one or both of the first CSI 342 or the second CSI 344. For example, the measurement report 340 may indicate one or more of the first CSI 342, the second CSI 344, or a metric 346 representing a combination of the first CSI 342 and the second CSI 344. To illustrate, in some examples, the measurement report 340 may indicate the first CSI 342 and may not indicate (or may exclude) the second CSI 344. In some other examples, the measurement report 340 may indicate the second CSI 344 and may not indicate (or may exclude) the first CSI 342. In some other examples, the measurement report 340 may indicate the metric 346 and may not include (or may exclude) one or both of the first CSI 342 or the second CSI 344.

To further illustrate, in some implementations, the metric 346 may include or may be based on a combination or average of parameters associated with the first CSI 342 and the second CSI 344. For example, the metric 346 may include or may be based on one or more of a combined or average SINR associated with the first CSI 342 and the second CSI 344, a combined or average CQI associated with the first CSI 342 and the second CSI 344, a combined or average RI associated with the first CSI 342 and the second CSI 344, a combined or average MCS associated with the first CSI 342 and the second CSI 344, or another combined or average parameter.

In some implementations, the base station 105 may transmit one or more configuration messages 314 to the UE 115. For example, the base station 105 may transmit the one or more configuration messages 314 to the UE 115 prior to transmitting the signal 320. The one or more configuration messages 314 may include downlink control information (DCI), radio resource control (RRC) signaling, or medium access control (MAC) control element (MAC-CE) signaling, as illustrative examples. The one or more configuration messages 314 may indicate one or more reporting parameters associated with the measurement report 340. To illustrate, a configuration message of the one or more configuration messages 314 may indicate whether the UE 115 is to report the first CSI 342, the second CSI 344, or the metric 346, and the measurement report 340 may indicate, in accordance with the configuration message, one or more of the first CSI 342, the second CSI 344, or the metric 346.

In some examples, the one or more configuration messages 314 may include a configuration message indicating whether the second CSI 344 is to be determined prior to determining the first CSI 342 or whether the first CSI 342 and the second CSI 344 are to be determined concurrently (or in parallel). To illustrate, in some implementations, the UE 115 may complete decoding of the c-message 324 prior to completing decoding of the p-message 322, such as if the p-message 322 is encrypted or more strongly encoded than the c-message 324, which may increase privacy associated with the p-message 322. In some such examples, the UE 115 may determine the second CSI 344 prior to determining the first CSI 342, and the configuration message may indicate that the UE 115 is to report the second CSI 344 prior to reporting the first CSI 342.

In some examples, the one or more configuration messages 314 may include a configuration message indicating one or both of whether the UE 115 is to separately encode or jointly encode the first CSI 342 and the second CSI 344 or whether the UE is to transmit the first CSI 342 and the second CSI 344 via a common resource or via separate resources. For example, the common resource may include one or more of common resource block (RB) or a common orthogonal frequency division multiplexing (OFDM) symbol, and the separate resources may include one or more of separate RBs or separate OFDM symbols. The UE 115 may transmit the first CSI 342 and the second CSI 344 in accordance with the configuration message.

In some implementations, the UE 115 may report the first CSI 342 and the second CSI 344 in connection with a hybrid automatic repeat request (HARQ) process. For example, the UE 115 may transmit, to the base station 105, a HARQ message 334 with the measurement report 340, such as by bundling the measurement report 340 with the HARQ message 334. In some examples, the HARQ message 334 may indicate an acknowledgement (ACK) of the signal 320 or a negative acknowledgement (NACK) of the signal 320. To further illustrate, in some implementations, the UE 115 may complete decoding of the c-message 324 prior to completing decoding of the p-message 322. In some such examples, the UE 115 may bundle the second CSI 344 with the HARQ message, both of which may be generated sooner than the first CSI 342 in some circumstances.

In some examples, the p-message 322 and the c-message 324 may be associated with different respective HARQ resources and may be associated with different HARQ messages. For example, the p-message 322 may be associated with a first HARQ resource, and the c-message 324 may be associated with a second HARQ resource. The first CSI 342 may be multiplexed with a first HARQ message associated with the p-message 322, and the second CSI 344 may be multiplexed with a second HARQ message associated with the c-message 324. The first HARQ message may indicate a first ACK or NACK associated with the p-message 322, and the second HARQ message may indicate a second ACK or NACK associated with the c-message 324. In another example, the UE 115 may transmit both the first HARQ message and the second HARQ message via either the first HARQ resource or the second HARQ resource.

The first CSI 342 and the second CSI 344 may be associated with different respective target block error rate (BLER) metrics or with a common BLER metric. To illustrate, a configuration message of the one or more configuration messages 314 may indicate one or more of a first target block error rate (BLER) metric 360 associated with the p-message 322 or a second target BLER metric 362 associated with the c-message 324. The UE 115 may transmit the measurement report 340 in accordance with the configuration message. Alternatively or in addition, the UE 115 may transmit the measurement report 340 in accordance with one or more of a first MCS table 364 associated with the p-message 322 or a second MCS table 366 associated with the c-message 324.

In some implementations, the first CSI 342 and the second CSI 344 are associated with a priority scheme 368. The priority scheme 368 may indicate respective priorities associated with reporting the first CSI 342 and the second CSI 344. In such examples, inclusion of one or both of the first CSI 342 or the second CSI 344 in the measurement report 340 is in accordance with the priority scheme 368. To illustrate, in some implementations, the measurement report 340 may have a particular quantity of bits available for CSI reporting. If inclusion of both the first CSI 342 and the second CSI 344 in the measurement report 340 would exceed the particular quantity of bits available for CSI reporting, the UE 115 may select one of the first CSI 342 or the second CSI 344 based on the priority scheme 368. In some implementations, the priority scheme 368 may indicate that the first CSI 342 is of a higher priority than the second CSI 344, since for example the first CSI 342 may correspond to the p-message 322, which may be specific to the UE 115 and which may contain higher-priority data as compared to the c-message 324. In some such examples, the UE 115 may "drop" the second CSI 344 from the measurement report 340. In some other examples, the priority scheme 368 may indicate that the second CSI 344 is of a higher priority than the first CSI 342. In some such examples, the UE 115 may "drop" the first CSI 342 from the measurement report 340.

In some examples, the base station 105 may configure the UE 115 with a report configuration for the first CSI 342 and the second CSI 344, such as where the first CSI 342 and the second CSI 344 "share" a common report configuration. In some examples, the report configuration may indicate a sequence or other metric for reporting the first CSI 342 and the second CSI 344. To illustrate, the one or more configuration messages 314 may include a configuration indicating the report configuration. The measurement report 340 may indicate one of the first CSI 342 or the second CSI 344 in accordance with the report configuration, and the UE 115 may transmit a second measurement report that indicates the other of the first CSI 342 or the second CSI 344 in accordance with the report configuration.

In an example, the reference signal 330 may correspond to a CSI-RS, and the base station 105 may pre-code the reference signal 330 via a same pre-coding technique as the p-message 322 and the c-message 324. The UE 115 may decode the p-message 322 and the c-message 324 (such as based on the same pre-coding technique) to determine a respective pre-coded channel for each of the p-message 322 and the c-message 324 and may identify a "best" pre-coded channel for each such message. For example, the UE 115 may identify the pre-coded channel having the greatest SINR or other metric and may report the identified pre-coded channel to the base station 105.

In some implementations, the base station 105 may use different respective pre-coders to pre-code the p-message 322 and the c-message 324 prior to transmitting the signal 320. For example, the base station 105 may use a first pre-coder 310 to pre-code the p-message 322 and may use a second pre-coder 312 different then the first pre-coder 310 to pre-code the c-message 324. In such examples, the p-message 322 may be associated with the first pre-coder 310, and the c-message 324 may be associated with the second pre-coder 312.

In some examples, the UE 115 may determine different respective channel measurements (or channel estimates) based on the p-message 322 and the c-message 324. For example, the measurement report 340 may indicate a first channel measurement indicator associated with the p-message 322 and a second channel measurement indicator associated with the c-message 324. In some examples, the UE 115 may measure, for each of the p-message 322 and the c-message 324, one or more parameters, such as one or more of a reference signal received power (RSRP), a reference signal received quality (RSRQ), or an SINR, for multiple different resources to determine multiple channel measurement indicators for each of the p-message 322 and the c-message 324. The first channel measurement indicator may correspond to the resource having the greatest RSRP, RSRQ, or SINR of the multiple channel measurement indicators for the p-message 322, and the second channel measurement indicator may correspond to the resource having the greatest RSRP, RSRQ, or SINR of the multiple channel measurement indicators for the c-message 324.

In some implementations, the base station 105 may configure different parameters for the p-message 322 and the c-message 324, such as via the one or more configuration messages 314. To illustrate, the base station 105 may transmit to the UE 115 a configuration message of the one or more configuration messages 314 that indicates, for each of the p-message 322 and the c-message 324, one or more of a pre-coding type, a codebook type, or a codebook restriction. The UE 115 may transmit the measurement report 340 in accordance with the configuration message. To further illustrate, in some examples, the configuration message may indicate that the p-message 322 is pre-coded via the first pre-coder 310 and may further indicate that the c-message 324 is pre-coded via the second pre-coder 312.

In some implementations, the base station 105 may transmit the c-message 324 using a wider beam or pre-coder as compared to the p-message 322, which may enable the c-message 324 to reach more UEs as compared to the p-message 322 (which may be unique to the UE 115). The base station 105 may configure the UE 115 with such beams or pre-coders via a pre-coding matrix indicator (PMI) configuration message, which may be included in the one or more configuration messages 314. In some cases, the base station 105 may restrict or exclude some beams or pre-coders from eligibility for the p-message 322, for the c-message 324, or both. For example, the base station 105 may exclude (such as via a first codebook subset restriction) one or more wider beams or pre-coders from eligibility for the p-message 322 and may exclude (such as via a second codebook subset restriction) one or more narrower beams or pre-coders from eligibility for the c-message 324. Accordingly, beams or pre-coders may be independently configured, restricted, or both, for the p-message 322 and the c-message 324.

In some examples, the first CSI 342 and the second CSI 344 may be associated with different sub-band resolutions. To illustrate, the first CSI 342 may be associated with a first sub-band resolution, and the second CSI 344 may be associated with a second sub-band resolution different than the first sub-band resolution. In some examples, the first sub-band resolution may be less than the second sub-band resolution. For example, the first sub-band resolution may correspond to a first quantity of sub-bands, and the second sub-band resolution may correspond to a second quantity of sub-bands greater than the first quantity. In some examples, the second sub-band resolution may be wideband-based.

Alternatively or in addition, in some examples, the UE 115 may report the first CSI 342 and the second CSI 344 using different respective quantities of bits. To illustrate, the first CSI 342 may be associated with a first quantity of bits, and the second CSI 344 may be associated with a second quantity of bits different than the first quantity of bits. In some examples, the first quantity of bits may be less than the second quantity of bits.

The base station 105 may receive, from the UE 115, one or more of the first CSI 342, the second CSI 344, or the metric 346. For example, the base station 105 may receive the measurement report 340 indicating one or more of the first CSI 342, the second CSI 344, or the metric 346. The base station 105 may perform one or more operations based on one or more of the first CSI 342, the second CSI 344, or the metric 346. For example, the one or more operations may include determining or adjusting one or more parameters associated with the UE 115.

As an illustrative example, based on the first CSI 342 failing to satisfy a threshold metric, the base station 105 may adjust from using the first pre-coder 310 to a third pre-coder associated with p-messages to transmitted to the UE 115, which may improve reception of the p-messages by the UE 115. As another illustrative example, based on the second CSI 344 failing to satisfy a threshold metric, the base station 105 may adjust from using the second pre-coder 312 to a fourth pre-coder associated with c-messages, which may improve reception of the c-messages by the UE 115. As an additional example, based on the metric 346 failing to satisfy a threshold metric, the base station 105 may adjust from using one or both of the first pre-coder 310 to the third pre-coder or from using the second pre-coder 312 to the fourth pre-coder, which may improve reception of one or both of p-messages or c-messages by the UE 115. To further illustrate, in some examples, performing the one or more operations (such as by changing pre-coders) may reduce a first BLER associated with p-messages (for example, so the first BLER is within the first target BLER metric 360), may reduce a second BLER associated with c-messages (for example, so the second BLER is within the second target BLER metric 362), or both.

Alternatively or in addition to adjusting a pre-coder, the one or more operations may include adjusting one or more other metrics. For example, alternatively or in addition to adjusting a pre-coder, the base station 105 may adjust one or more of a rank associated with the UE 115 or an MCS associated with the UE 115, as illustrative examples.

Although some examples are described with reference to the base station 105 and the UE 115, other examples are also within the scope of the disclosure. For example, in some aspects, the UE 115 may include a message combiner corresponding to the message combiner 302 and may perform one or more operations described with reference to the base station 105. For example, the UE 115 may communicate with one or more base stations, one or more other UEs, or a combination thereof, in accordance with an RS or RSMA technique using one or more operations described with reference to the base station 105.

One or more aspects described herein may improve performance of one or more devices of a wireless communication system, such as the wireless communication system 300. For example, by reporting CSI associated with the p-message 322 and the c-message 324 (such as one or more of the first CSI 342, the second CSI 344, or the metric 346), the base station 105 may independently determine or adjust one or more parameters associated with p-messages, c-messages, or both. To illustrate, the one or more parameters may include a pre-coder, a rank, or an MCS. By independently adjusting the one or more parameters, the base station 105 may independently reduce BLER metrics associated with the p-messages and c-messages to within the first target BLER metric 360 and the second target BLER metric 362, respectively. As a result, reception of p-messages and c-messages within the wireless communication system 300 may be improved, which may reduce a number of NACK messages and retransmissions in some cases.

FIG. 4 is a flow diagram illustrating an example process 400 that supports CSI reporting for one or both of a p-message or a c-message according to one or more aspects. Operations of the process 400 may be performed by a UE, such as the UE 115.

In block 402, the UE 115 receives a signal that includes a p-message associated with the UE and a c-message associated with the UE and at least one other UE. For example, the UE 115 may receive the signal 320 including the p-message 322 and the c-message 324. The p-message 322 may be associated with the UE 115, and the c-message 324 may be associated with the UE 115 and at least one other UE.

In block 404, the UE 115 transmits a measurement report that indicates one or both of first CSI associated with the p-message or second CSI associated with the c-message. For example, the UE 115 may transmit the measurement report 340 indicating one or more of the first CSI 342, the second CSI 344, or the metric 346.

FIG. 5 is a flow diagram illustrating an example process 500 that supports CSI reporting for one or both of a p-message or a c-message according to one or more aspects. Operations of the process 500 may be performed by a base station, such as the base station 105.

In block 502, the base station 105 transmits a signal that includes a p-message associated with a UE and a c-message associated with the UE and at least one other UE. For example, the base station 105 may transmit the signal 320 including the p-message 322 and the c-message 324. The p-message 322 may be associated with the UE 115, and the c-message 324 may be associated with the UE 115 and at least one other UE.

In block 504, the base station 105 receives a measurement report from the UE that indicates one or both of first CSI associated with the p-message or second CSI associated with the c-message. For example, the base station 105 may receive the measurement report 340 indicating one or more of the first CSI 342, the second CSI 344, or the metric 346.

Figure 6:
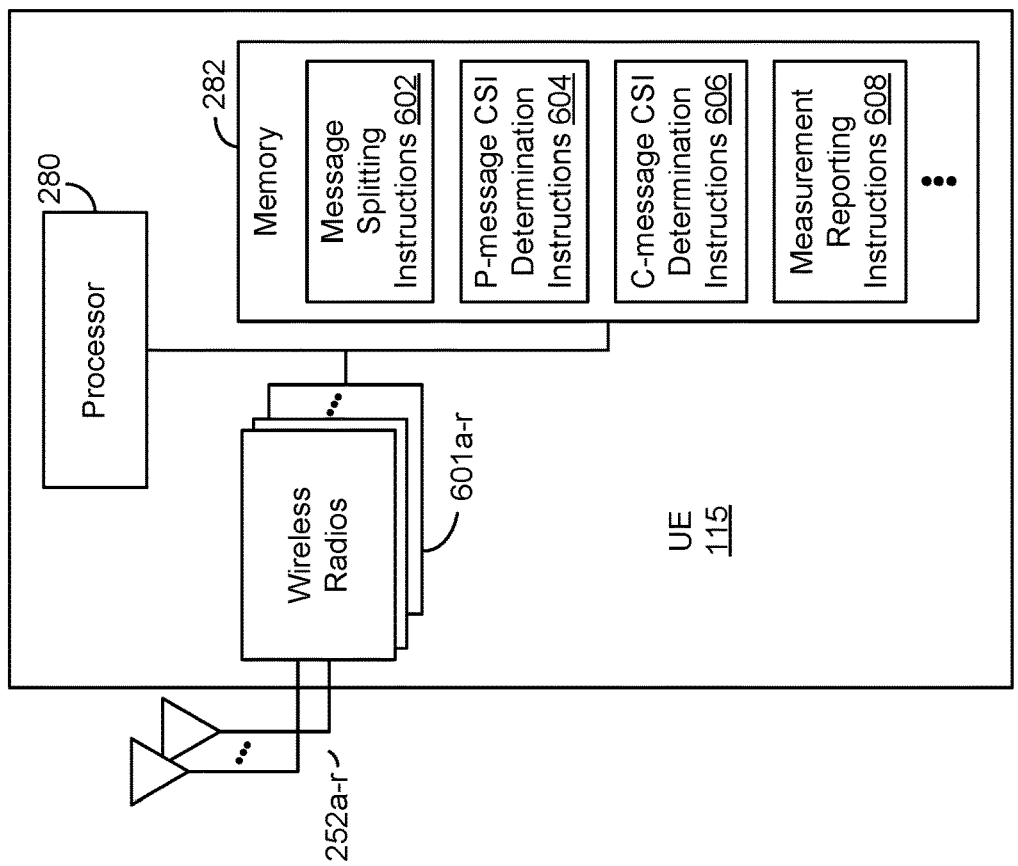
FIG. 6 is a block diagram of an example UE that supports CSI reporting for one or both of a p-message or a c-message according to one or more aspects.

FIG. 6 is a block diagram illustrating an example of the UE 115 according to some aspects of the disclosure. The UE 115 may include structure, hardware, or components illustrated in FIG. 2. For example, the UE 115 may include the processor 280, which may execute instructions stored in the memory 282. Using the processor 280, the UE 115 may transmit and receive signals via wireless radios 601a-r and antennas 252a-r. The wireless radios 601a-r may include one or more components or devices described herein, such as the modulator/demodulators 254a-r, the MIMO detector 256, the receive processor 258, the transmit processor 264, the TX MIMO processor 266, the transmitter 356, the receiver 358, one or more other components or devices, or a combination thereof.

In some examples, the memory 282 may store instructions executable by one or more processors (such as the processor 280) to initiate, perform, or control one or more operations described herein. For example, the memory 282 may store message splitting instructions 602 executable by the processor 280 to determine the p-message 322 and the c-message 324 based on the signal 320, such as using an RS or RSMA technique. As another example, the memory 282 may store p-message CSI determination instructions 604 and c-message CSI determination instructions 606 executable by the processor 280 to determine the first CSI 342 and the second CSI 344, respectively. As an additional example, the memory 282 may store measurement reporting instructions 608 executable by the processor 280 to transmit the measurement report 340.

Figure 7:
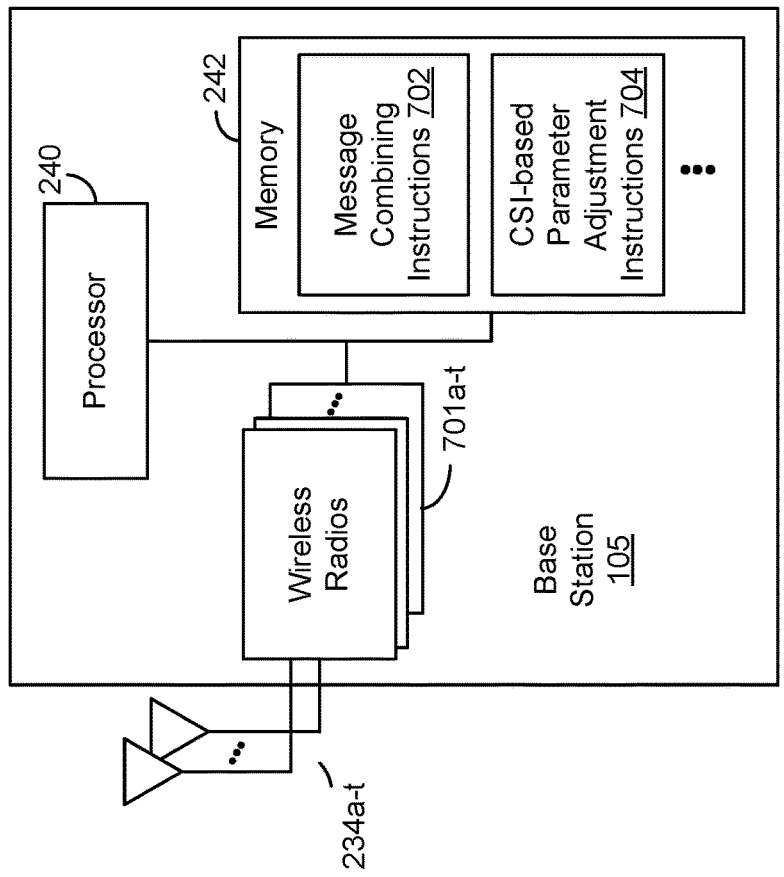
FIG. 7 is a block diagram of an example base station that supports CSI reporting for one or both of a p-message or a c-message according to one or more aspects.

FIG. 7 is a block diagram illustrating an example of the base station 105 according to some aspects of the disclosure. The base station 105 may include structure, hardware, and components illustrated in FIG. 2. For example, the base station 105 may include the processor 240, which may execute instructions stored in memory 242. Under control of the processor 240, the base station 105 may transmit and receive signals via wireless radios 701a-t and antennas 234a-t. The wireless radios 701a-t may include one or more components or devices described herein, such as the modulator/demodulators 232a-t, the MIMO detector 236, the receive processor 238, the transmit processor 220, the TX MIMO processor 230, the transmitter 306, the receiver 308, one or more other components or devices, or a combination thereof.

In some examples, the memory 242 may store instructions executable by one or more processors (such as the processor 240) to initiate, perform, or control one or more operations described herein. For example, the memory 242 may store message combining instructions 702 executable by the processor 240 to generate the signal based on the p-message 322 and the c-message 324, such as using an RS or RSMA technique. As another example, the memory 242 may store CSI-based parameter adjustment instructions 704 executable to receive the measurement report 340 and to adjust one or more parameters associated with the UE 115 based on the measurement report 340. For example, the base station 105 may perform one or more operations described with reference to FIG. 3, such as by adjusting one or more of a pre-coder associated with the UE 115, a rank associated with the UE 115, or an MCS associated with the UE 115, as illustrative examples.

Figure 8:
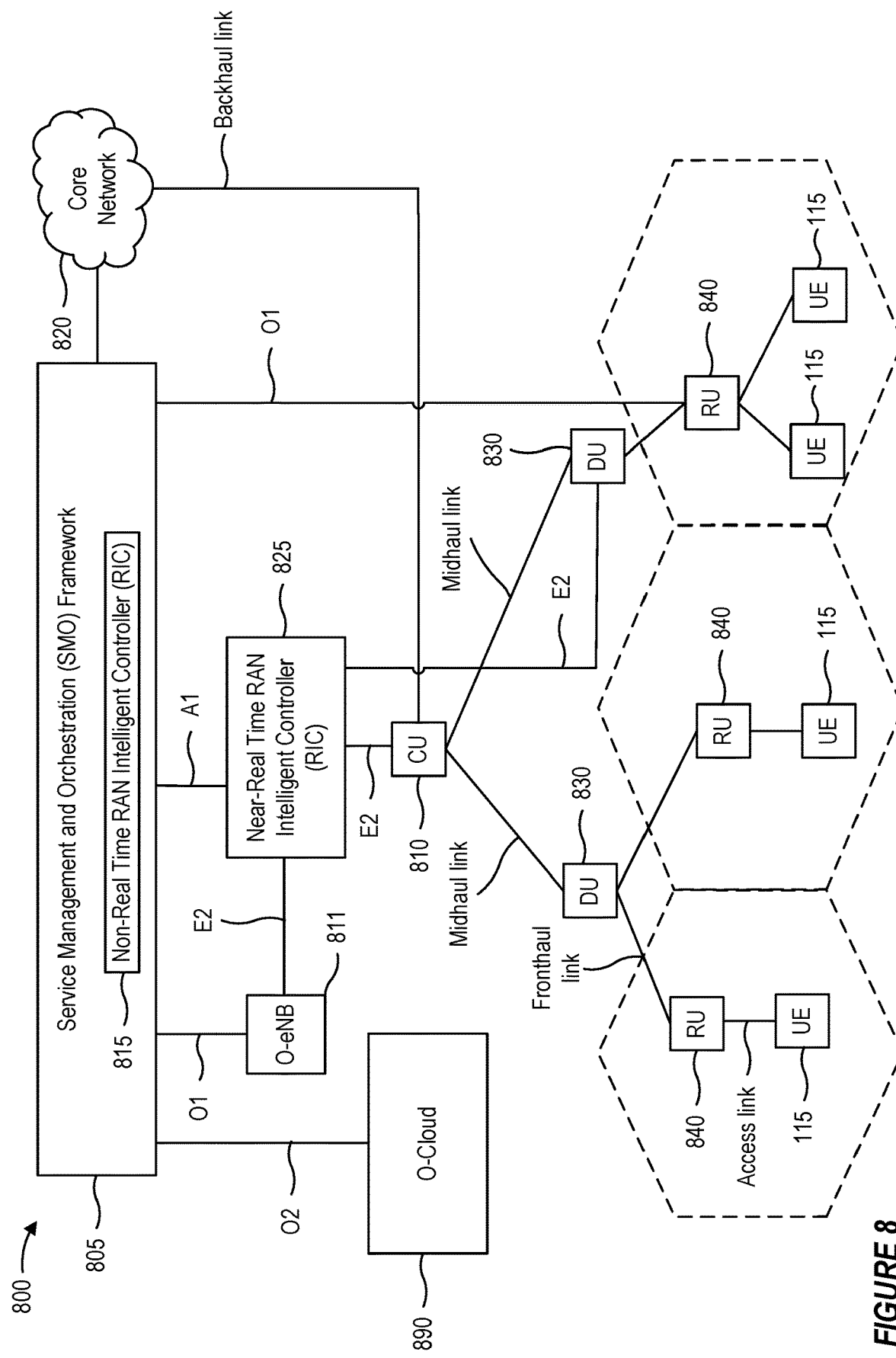
FIG. 8 shows a diagram illustrating an example disaggregated base station architecture according to some aspects of the disclosure.

FIG. 8 shows a diagram illustrating an example disaggregated base station 800 architecture according to some aspects of the disclosure. In some examples, the disaggregated base station 800 architecture may be used to implement the base station 105. The disaggregated base station 800 architecture may include one or more central units (CUs) 810 that can communicate directly with a core network 820 via a backhaul link, or indirectly with the core network 820 through one or more disaggregated base station units (such as a Near-Real Time (Near-RT) RAN Intelligent Controller (RIC) 825 via an E2 link, or a Non-Real Time (Non-RT) RIC 815 associated with a Service Management and Orchestration (SMO) Framework 805, or both). A CU 810 may communicate with one or more distributed units (DUs) 830 via respective midhaul links, such as an F1 interface. The DUs 830 may communicate with one or more radio units (RUs) 840 via respective fronthaul links. The RUs 840 may communicate with respective UEs 115 via one or more radio frequency (RF) access links. In some implementations, the UE 115 may be simultaneously served by multiple RUs 840.

Each of the units, i.e., the CUs 810, the DUs 830, the RUs 840, as well as the Near-RT RICs 825, the Non-RT RICs 815 and the SMO Framework 805, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 810 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 810. The CU 810 may be configured to handle user plane functionality (i.e., Central Unit-User Plane (CU-UP)), control plane functionality (i.e., Central Unit-Control Plane (CU-CP)), or a combination thereof. In some implementations, the CU 810 can be logically split into one or more CU-UP units and one or more CU-CP units. The CU-UP unit can communicate bidirectionally with the CU-CP unit via an interface, such as the E1 interface when implemented in an O-RAN configuration. The CU 810 can be implemented to communicate with the DU 830, as necessary, for network control and signaling.

The DU 830 may correspond to a logical unit that includes one or more base station functions to control the operation of one or more RUs 840. In some aspects, the DU 830 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 830 may further host one or more low PHY layers. Each layer (or module) can be implemented with an interface configured to communicate signals with other layers (and modules) hosted by the DU 830, or with the control functions hosted by the CU 810.

Lower-layer functionality can be implemented by one or more RUs 840. In some deployments, an RU 840, controlled by a DU 830, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 840 can be implemented to handle over the air (OTA) communication with one or more UEs 115. In some implementations, real-time and non-real-time aspects of control and user plane communication with the RU(s) 840 can be controlled by the corresponding DU 830. In some scenarios, this configuration can enable the DU(s) 830 and the CU 810 to be implemented in a cloud-based RAN architecture, such as a vRAN architecture.

The SMO Framework 805 may be configured to support RAN deployment and provisioning of non-virtualized and virtualized network elements. For non-virtualized network elements, the SMO Framework 805 may be configured to support the deployment of dedicated physical resources for RAN coverage requirements which may be managed via an operations and maintenance interface (such as an O1 interface). For virtualized network elements, the SMO Framework 805 may be configured to interact with a cloud computing platform (such as an open cloud (O-Cloud) 890) to perform network element life cycle management (such as to instantiate virtualized network elements) via a cloud computing platform interface (such as an O2 interface). Such virtualized network elements can include, but are not limited to, CUs 810, DUs 830, RUs 840 and Near-RT RICs 825. In some implementations, the SMO Framework 805 can communicate with a hardware aspect of a 4G RAN, such as an open eNB (O-eNB) 811, via an O1 interface. Additionally, in some implementations, the SMO Framework 805 can communicate directly with one or more RUs 840 via an O1 interface. The SMO Framework 805 also may include a Non-RT RIC 815 configured to support functionality of the SMO Framework 805.

The Non-RT RIC 815 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 825. The Non-RT RIC 815 may be coupled to or communicate with (such as via an AI interface) the Near-RT RIC 825. The Near-RT RIC 825 may be configured to include a logical function that enables near-real-time control and optimization of RAN elements and resources via data collection and actions over an interface (such as via an E2 interface) connecting one or more CUs 810, one or more DUs 830, or both, as well as an O-eNB, with the Near-RT RIC 825.

In some implementations, to generate AI/ML models to be deployed in the Near-RT RIC 825, the Non-RT RIC 815 may receive parameters or external enrichment information from external servers. Such information may be utilized by the Near-RT RIC 825 and may be received at the SMO Framework 805 or the Non-RT RIC 815 from non-network data sources or from network functions. In some examples, the Non-RT RIC 815 or the Near-RT RIC 825 may be configured to tune RAN behavior or performance. For example, the Non-RT RIC 815 may monitor long-term trends and patterns for performance and employ AI/ML models to perform corrective actions through the SMO Framework 805 (such as reconfiguration via 01) or via creation of RAN management policies (such as AI policies).

According to some further aspects, in a first aspect, a UE includes at least one processor and a memory coupled with the at least one processor and storing processor-readable instructions that, when executed by the at least one processor, is configured to receive a signal that includes a private message (p-message) associated with the UE and a common message (c-message) associated with the UE and at least one other UE. The processor-readable code is further executable by the at least one processor to transmit a measurement report that indicates one or both of first channel state information (CSI) associated with the p-message or second CSI associated with the c-message.

In a second aspect in combination with the first aspect, the processor-readable code is further executable by the at least one processor to receive a configuration message, and the measurement report indicates, in accordance with the configuration message, one or more of the first CSI, the second CSI, or a metric representing a combination of the first CSI and the second CSI.

In a third aspect, in combination with one or more of the first through second aspects, the processor-readable code is further executable by the at least one processor to receive a configuration message indicating whether the second CSI is to be determined prior to determining the first CSI or whether the first CSI and the second CSI are to be determined concurrently.

In a fourth aspect, in combination with one or more of the first through third aspects, the processor-readable code is further executable by the at least one processor to receive a configuration message indicating one or both of whether the first CSI and the second CSI are to be separately encoded or jointly encoded or whether the first CSI and the second CSI are to be transmitted via a common resource or via separate resources.

In a fifth aspect, in combination with one or more of the first through fourth aspects, the processor-readable code is further executable by the at least one processor to transmit a HARQ message with the measurement report, and the measurement report is bundled with the HARQ message.

In a sixth aspect, in combination with one or more of the first through fifth aspects, the p-message is associated with a first HARQ resource, the c-message is associated with a second HARQ resource, the first CSI is multiplexed with a first HARQ message associated with the p-message, and the second CSI is multiplexed with a second HARQ message associated with the c-message.

In a seventh aspect, in combination with one or more of the first through sixth aspects, the first CSI and the second CSI are associated with different respective target BLER metrics or with a common BLER metric.

In an eighth aspect, in combination with one or more of the first through seventh aspects, the processor-readable code is further executable by the at least one processor to receive a configuration message indicating one or more of a first target BLER metric associated with the p-message or a second target BLER metric associated with the c-message and to transmit the measurement report in accordance with the configuration message.

In a ninth aspect, in combination with one or more of the first through eighth aspects, the processor-readable code is further executable by the at least one processor to receive a first reference signal associated with the p-message, to determine the first CSI in accordance with the first reference signal, to receive a second reference signal associated with the c-message, and to determine the second CSI in accordance with the second reference signal.

In a tenth aspect, in combination with one or more of the first through ninth aspects, the processor-readable code is further executable by the at least one processor to determine a first plurality of LLR values associated with a first data portion of the p-message, to determine the first CSI in accordance with the first plurality of LLR values, to determine a second plurality of LLR values associated with a second data portion of the c-message, and to determine the second CSI in accordance with the second plurality of LLR values.

In an eleventh aspect, a method for wireless communication performed by a UE includes receiving a signal that includes a p-message associated with the UE and a c-message associated with the UE and at least one other UE. The method further includes transmitting a measurement report that indicates one or both of first CSI associated with the p-message or second CSI associated with the c-message.

In a twelfth aspect, in combination with the eleventh aspect, the method includes receiving a configuration message, and the measurement report indicates, in accordance with the configuration message, one or more of the first CSI, the second CSI, or a metric representing a combination of the first CSI and the second CSI.

In a thirteenth aspect, in combination with one or more of the eleventh through twelfth aspects, the method includes receiving a configuration message indicating whether the second CSI is to be determined prior to determining the first CSI or whether the first CSI and the second CSI are to be determined concurrently.

In a fourteenth aspect, in combination with one or more of the eleventh through thirteenth aspects, the method includes receiving a configuration message indicating one or both of whether the first CSI and the second CSI are to be separately encoded or jointly encoded or whether the first CSI and the second CSI are to be transmitted via a common resource or via separate resources. The UE transmits the measurement report in accordance with the configuration message.

In a fifteenth aspect, in combination with one or more of the eleventh through fourteenth aspects, the method includes transmitting a HARQ message with transmitting the measurement report, and the measurement report is bundled with the HARQ message.

In a sixteenth aspect, in combination with one or more of the eleventh through fifteenth aspects, the p-message is associated with a first HARQ resource, the c-message is associated with a second HARQ resource, the first CSI is multiplexed with a first HARQ message associated with the p-message, and the second CSI is multiplexed with a second HARQ message associated with the c-message.

In a seventeenth aspect, in combination with one or more of the eleventh through sixteenth aspects, the first CSI and the second CSI are associated with different respective target BLER metrics or with a common BLER metric.

In an eighteenth aspect, in combination with one or more of the eleventh through seventeenth aspects, the method includes receiving a configuration message indicating one or more of a first target BLER metric associated with the p-message or a second target BLER metric associated with the c-message, and the measurement report is transmitted in accordance with the configuration message.

In a nineteenth aspect, in combination with one or more of the eleventh through eighteenth aspects, the method includes receiving a first reference signal associated with the p-message, and the first CSI is determined in accordance with the first reference signal, and the method includes receiving a second reference signal associated with the c-message. The second CSI is determined in accordance with the second reference signal.

In a twentieth aspect, in combination with one or more of the eleventh through nineteenth aspects, the method includes determining a first plurality of LLR values associated with a first data portion of the p-message, the first CSI determined in accordance with the first plurality of LLR values, and further includes determining a second plurality of LLR values associated with a second data portion of the c-message, the second CSI determined in accordance with the second plurality of LLR values.

In a twenty-first aspect, a base station includes at least one processor and a memory coupled with the at least one processor and storing processor-readable code that, when executed by the at least one processor, is configured to transmit a signal that includes a p-message associated with a UE and a c-message associated with the UE and at least one other UE. The processor-readable code is further executable by the at least one processor to receive a measurement report from the UE that indicates one or both of first CSI associated with the p-message or second CSI associated with the c-message.

In a twenty-second aspect, in combination with the twenty-first aspect, the processor-readable code is further executable by the at least one processor to transmit a configuration message, and the measurement report indicates, in accordance with the configuration message, one or more of the first CSI, the second CSI, or a metric representing a combination of the first CSI and the second CSI.

In a twenty-third aspect, in combination with one or more of the twenty-first through twenty-second aspects, the processor-readable code is further executable by the at least one processor to transmit a configuration message indicating whether the second CSI is to be determined prior to determining the first CSI or whether the first CSI and the second CSI are to be determined concurrently.

In a twenty-fourth aspect, in combination with one or more of the twenty-first through twenty-third aspects, the processor-readable code is further executable by the at least one processor to transmit a configuration message indicating one or both of whether the first CSI and the second CSI are to be separately encoded or jointly encoded or whether the first CSI and the second CSI are to be transmitted via a common resource or via separate resources.

In a twenty-fifth aspect, in combination with one or more of the twenty-first aspect through twenty-fourth aspects, the processor-readable code is further executable by the at least one processor to receive a HARQ message with the measurement report, and the measurement report is bundled with the HARQ message.

In a twenty-sixth aspect, a method for wireless communication performed by a base station includes transmitting a signal that includes a p-message associated with a UE and a c-message associated with the UE and at least one other UE. The method further includes receiving a measurement report from the UE that indicates one or both of first CSI associated with the p-message or second CSI associated with the c-message.

In a twenty-seventh aspect, in combination with the twenty-sixth aspect, the method includes transmitting a configuration message, and the measurement report indicates, in accordance with the configuration message, one or more of the first CSI, the second CSI, or a metric representing a combination of the first CSI and the second CSI.

In a twenty-eighth aspect, in combination with one or more of the twenty-sixth through twenty-seventh aspects, the method includes transmitting a configuration message indicating whether the second CSI is to be determined prior to determining the first CSI or whether the first CSI and the second CSI are to be determined concurrently.

In a twenty-ninth aspect, in combination with one or more of the twenty-sixth through twenty-eighth aspects, the method includes transmitting a configuration message indicating one or both of whether the first CSI and the second CSI are to be separately encoded or jointly encoded or whether the first CSI and the second CSI are to be transmitted via a common resource or via separate resources, and the UE transmits the measurement report in accordance with the configuration message.

In a thirtieth aspect, in combination with one or more of the twenty-sixth through twenty-ninth aspects, the method includes receiving a HARQ message with transmitting the measurement report, and the measurement report is bundled with the HARQ message.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-8 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, some other implementations are within the scope of the following claims. In some cases, the actions recited in the claims can be performed in a different order and still achieve desirable results.

As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A user equipment (UE) comprising:
    at least one processor; and
    a memory coupled with the at least one processor and storing processor-readable code that, when executed by the at least one processor, is configured to:
        receive a signal that includes a private message (p-message) associated with the UE and a common message (c-message) associated with the UE and at least one other UE, the p-message being associated with a first hybrid automatic repeat request (HARQ) resource and the c-message being associated with a second HARQ resource; and
        transmit a measurement report that indicates one or both of first channel state information (CSI) associated with the p-message or second CSI associated with the c-message, the first CSI, when indicated in the measurement report, being multiplexed with a first HARQ message associated with the p-message, the second CSI, when indicated in the measurement report, being multiplexed with a second HARQ message associated with the c-message.

2. The UE of claim 1, wherein the processor-readable code is further executable by the at least one processor to receive a configuration message, and wherein the measurement report indicates, in accordance with the configuration message, one or more of the first CSI, the second CSI, or a metric representing a combination of the first CSI and the second CSI.

3. The UE of claim 1, wherein the processor-readable code is further executable by the at least one processor to receive a configuration message indicating whether the second CSI is to be determined prior to determining the first CSI or whether the first CSI and the second CSI are to be determined concurrently.

4. The UE of claim 1, wherein the processor-readable code is further executable by the at least one processor to receive a configuration message indicating one or both of:
    whether the first CSI and the second CSI are to be separately encoded or jointly encoded; or
    whether the first CSI and the second CSI are to be transmitted via a common resource or via separate resources.

5. The UE of claim 1, wherein the processor-readable code is further executable by the at least one processor to transmit a hybrid automatic repeat request (HARQ) message with the measurement report, and wherein the measurement report is bundled with the HARQ message.

6. The UE of claim 1, wherein the first CSI and the second CSI are associated with different respective target block error rate (BLER) metrics or with a common BLER metric.

7. The UE of claim 1, wherein the processor-readable code is further executable by the at least one processor to:
    receive a configuration message indicating one or more of a first target block error rate (BLER) metric associated with the p-message or a second target BLER metric associated with the c-message; and
    transmit the measurement report in accordance with the configuration message.

8. The UE of claim 1, wherein the processor-readable code is further executable by the at least one processor to:
    receive a first reference signal associated with the p-message;
    determine the first CSI in accordance with the first reference signal;
    receive a second reference signal associated with the c-message; and
    determine the second CSI in accordance with the second reference signal.

9. The UE of claim 1, wherein the processor-readable code is further executable by the at least one processor to:
    determine a first plurality of log-likelihood ratio (LLR) values associated with a first data portion of the p-message;

determine the first CSI in accordance with the first plurality of LLR values;
determine a second plurality of LLR values associated with a second data portion of the c-message; and
determine the second CSI in accordance with the second plurality of LLR values.

10. A method for wireless communication performed by a user equipment (UE), the method comprising:
receiving a signal that includes a private message (p-message) associated with the UE and a common message (c-message) associated with the UE and at least one other UE, the p-message being associated with a first hybrid automatic repeat request (HARQ) resource and the c-message being associated with a second HARQ resource; and
transmitting a measurement report that indicates one or both of first channel state information (CSI) associated with the p-message or second CSI associated with the c-message, the first CSI, when indicated in the measurement report, being multiplexed with a first HARQ message associated with the p-message, the second CSI, when indicated in the measurement report, being multiplexed with a second HARQ message associated with the c-message.

11. The method of claim 10, further comprising receiving a configuration message, wherein the measurement report indicates, in accordance with the configuration message, one or more of the first CSI, the second CSI, or a metric representing a combination of the first CSI and the second CSI.

12. The method of claim 10, further comprising receiving a configuration message indicating whether the second CSI is to be determined prior to determining the first CSI or whether the first CSI and the second CSI are to be determined concurrently.

13. The method of claim 10, further comprising receiving a configuration message indicating one or both of:
whether the first CSI and the second CSI are to be separately encoded or jointly encoded; or
whether the first CSI and the second CSI are to be transmitted via a common resource or via separate resources,
wherein the UE transmits the measurement report in accordance with the configuration message.

14. The method of claim 10, further comprising transmitting a hybrid automatic repeat request (HARQ) message with transmitting the measurement report, wherein the measurement report is bundled with the HARQ message.

15. The method of claim 10, wherein the first CSI and the second CSI are associated with different respective target block error rate (BLER) metrics or with a common BLER metric.

16. The method of claim 10, further comprising receiving a configuration message indicating one or more of a first target block error rate (BLER) metric associated with the p-message or a second target BLER metric associated with the c-message, wherein the measurement report is transmitted in accordance with the configuration message.

17. The method of claim 10, further comprising:
receiving a first reference signal associated with the p-message, wherein the first CSI is determined in accordance with the first reference signal; and
receiving a second reference signal associated with the c-message, wherein the second CSI is determined in accordance with the second reference signal.

18. The method of claim 10, further comprising:
determining a first plurality of log-likelihood ratio (LLR) values associated with a first data portion of the p-message, wherein the first CSI is determined in accordance with the first plurality of LLR values; and
determining a second plurality of LLR values associated with a second data portion of the c-message, wherein the second CSI is determined in accordance with the second plurality of LLR values.

19. A base station comprising:
at least one processor; and
a memory coupled with the at least one processor and storing processor-readable code that, when executed by the at least one processor, is configured to:
transmit a signal that includes a private message (p-message) associated with a user equipment (UE) and a common message (c-message) associated with the UE and at least one other UE, the p-message being associated with a first hybrid automatic repeat request (HARQ) resource and the c-message being associated with a second HARQ resource; and
receive a measurement report from the UE that indicates one or both of first channel state information (CSI) associated with the p-message or second CSI associated with the c-message, the first CSI, when indicated in the measurement report, being multiplexed with a first HARQ message associated with the p-message, the second CSI, when indicated in the measurement report, being multiplexed with a second HARQ message associated with the c-message.

20. The base station of claim 19, wherein the processor-readable code is further executable by the at least one processor to transmit a configuration message, and wherein the measurement report indicates, in accordance with the configuration message, one or more of the first CSI, the second CSI, or a metric representing a combination of the first CSI and the second CSI.

21. The base station of claim 19, wherein the processor-readable code is further executable by the at least one processor to transmit a configuration message indicating whether the second CSI is to be determined prior to determining the first CSI or whether the first CSI and the second CSI are to be determined concurrently.

22. The base station of claim 19, wherein the processor-readable code is further executable by the at least one processor to transmit a configuration message indicating one or both of:
whether the first CSI and the second CSI are to be separately encoded or jointly encoded; or
whether the first CSI and the second CSI are to be transmitted via a common resource or via separate resources.

23. The base station of claim 19, wherein the processor-readable code is further executable by the at least one processor to receive a hybrid automatic repeat request (HARQ) message with the measurement report, wherein the measurement report is bundled with the HARQ message.

24. A method for wireless communication performed by a base station, the method comprising:
transmitting a signal that includes a private message (p-message) associated with a user equipment (UE) and a common message (c-message) associated with the UE and at least one other UE, the p-message being associated with a first hybrid automatic repeat request (HARQ) resource and the c-message being associated with a second HARQ resource; and receiving a measurement report from the UE that indicates one or both of first channel state information (CSI) associated with the p-message or second CSI associated with the c-message, the first CSI, when indicated in the measurement report, being multiplexed with a first HARQ message associated with the p-message, the second CSI, when indicated in the measurement report, being multiplexed with a second HARQ message associated with the c-message.

25. The method of claim 24, further comprising transmitting a configuration message, wherein the measurement report indicates, in accordance with the configuration message, one or more of the first CSI, the second CSI, or a metric representing a combination of the first CSI and the second CSI.

26. The method of claim 24, further comprising transmitting a configuration message indicating whether the second CSI is to be determined prior to determining the first CSI or whether the first CSI and the second CSI are to be determined concurrently.

27. The method of claim 24, further comprising transmitting a configuration message indicating one or both of:
 whether the first CSI and the second CSI are to be separately encoded or jointly encoded; or
 whether the first CSI and the second CSI are to be transmitted via a common resource or via separate resources,
 wherein the UE transmits the measurement report in accordance with the configuration message.

28. The method of claim 24, further comprising receiving a hybrid automatic repeat request (HARQ) message with transmitting the measurement report, wherein the measurement report is bundled with the HARQ message.

* * * * *